US012013091B2

(12) United States Patent
Kuepper et al.

(10) Patent No.: US 12,013,091 B2
(45) Date of Patent: Jun. 18, 2024

(54) LED RETROFIT FOR VEHICLE LIGHTING

(71) Applicant: LUMILEDS LLC, San Jose, CA (US)

(72) Inventors: Lukas Kuepper, Aachen (DE); Dirk Niederste-Werbeck, Aachen (DE)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 17/740,074

(22) Filed: May 9, 2022

(65) Prior Publication Data

US 2022/0357008 A1 Nov. 10, 2022

Related U.S. Application Data

(60) Provisional application No. 63/185,814, filed on May 7, 2021.

(51) Int. Cl.

| | |
|---|---|
| ***F21Y 107/30*** | (2016.01) |
| ***F21S 41/147*** | (2018.01) |
| ***F21S 41/19*** | (2018.01) |

(52) U.S. Cl.
CPC ........... *F21S 41/147* (2018.01); *F21S 41/192* (2018.01); *F21Y 2107/30* (2016.08)

(58) Field of Classification Search
CPC .. F21K 9/237; F21K 9/235; F21K 9/23; F21S 41/192; F21S 41/148; F21S 43/14; F21S 41/19; F21S 41/141; F21V 19/04; F21Y 2115/10; F21W 2102/00; F21W 2102/13; F21W 2102/135; F21W 2107/10
See application file for complete search history.

(56) References Cited

U.S. PATENT DOCUMENTS

| | | | |
|---|---|---|---|
| 9,964,260 | B2 | 5/2018 | Haenen et al. |
| 10,161,614 | B2 | 12/2018 | Creusen et al. |
| 10,458,613 | B2 | 10/2019 | Vincens |

(Continued)

FOREIGN PATENT DOCUMENTS

| | | | | |
|---|---|---|---|---|
| DE | 102007059471 A1 * | 6/2009 | .............. | F21K 9/23 |
| EP | 3647649 | 5/2020 | | |

(Continued)

OTHER PUBLICATIONS

Search English translation of DE-102007059471-A1 (Year: 2009).*

(Continued)

*Primary Examiner* — Omar Rojas Cadima
(74) *Attorney, Agent, or Firm* — Volpe Koenig

(57) ABSTRACT

An LED retrofit lamp includes a centering ring with alignment features, which define: a mounting position of the lamp within a vehicle reflector, a reference axis, a reference direction along the reference axis from a base to a top end of the lamp, and a tolerance box intersecting the reference axis and extending axially along the reference direction from a tolerance box base-side end to a tolerance box top-side end. The lamp also includes an arrangement that emits light transversal to the reference axis and has a light-emitting area that extends axially from an LED base-side end to an LED top-side end. The LED base-side end has an axial distance of at least 0.1 mm from the tolerance box base-side end in the reference direction, and the LED top-side end has an axial distance of at most 1.5 mm from the tolerance box top-side end in the reference direction.

20 Claims, 14 Drawing Sheets

(56) References Cited

U.S. PATENT DOCUMENTS

2018/0356061 A1* 12/2018 Wang .................... F21S 41/147

FOREIGN PATENT DOCUMENTS

EP 3828463 A1 * 6/2021 ............... F21K 9/23
WO 2009/037053 3/2009

OTHER PUBLICATIONS

Addendum 36: Regulation No. 37, Agreement Concerning the adoption of uniform technical prescriptions for wheeled vehicles, equipment and parts which can be fitted and/or be used on wheeled vehicles and the conditions for reciprocal recognition of approvals granted on the basis of these prescriptions (Jul. 3, 2012).
Addendum 98: Regulation No. 99, Agreement Concerning the Adoption of Uniform Technical Prescriptions for Wheeled Vehicles, Equipment and Parts which can be fitted and/or be used on Wheeled Vehicles and the Conditions for Reciprocal Recognition of Approvals Granted on the Basis of these Prescriptions (Aug. 15, 2012).
"Uniform Provisions Concerning the Approval of Filaments Lamps for Use in Approved Lamp Units on Power-Driven Vehicles and of their Trailers", United Nations Economic Commission for Europe, Regulation, XX, XX, No. 37 rev. 4, Oct. 26, 2005 (2005).

* cited by examiner (a)

(b)

(a)

(b)

LED RETROFIT FOR VEHICLE LIGHTING

CROSS REFERENCE TO RELATED APPLICATIONS

This application claims the benefit of U.S. Provisional Patent Application No. 63/185,814, which was filed on May 7, 2021, the contents of which are hereby incorporated by reference herein.

BACKGROUND

Light emitting diodes (LEDs) more and more replace older technology light sources, such as halogen, gas-discharge, and Xenon, lamps (commonly collectively referred to as conventional lamps) due to superior technical properties, such as energy efficiency and lifetime. This is also true for demanding applications in terms of, for example, luminance, luminosity, and/or beam shaping (e.g., for vehicle headlighting). Considering the vast installation base of conventional lamps, it may be of great economic interest in one-to-one replacing conventional lamps with so-called LED retrofit lamps (LED retrofits for short) while allowing continued use of other existing system components, such as optics (e.g., reflectors and/or lenses) and luminaires.

SUMMARY

An LED retrofit lamp includes a centering ring with alignment features, which define: a mounting position of the lamp within a vehicle reflector, a reference axis, a reference direction along the reference axis from a base to a top end of the lamp, and a tolerance box intersecting the reference axis and extending axially along the reference direction from a tolerance box base-side end to a tolerance box top-side end. The lamp also includes an arrangement that emits light transversal to the reference axis and has a light-emitting area that extends axially from an LED base-side end to an LED top-side end. The LED base-side end has an axial distance of at least 0.1 mm from the tolerance box base-side end in the reference direction, and the LED top-side end has an axial distance of at most 1.5 mm from the tolerance box top-side end in the reference direction.

BRIEF DESCRIPTION OF THE DRAWINGS

A more detailed understanding can be had from the following description, given by way of example in conjunction with the accompanying drawings wherein.

DETAILED DESCRIPTION

Figure 1:
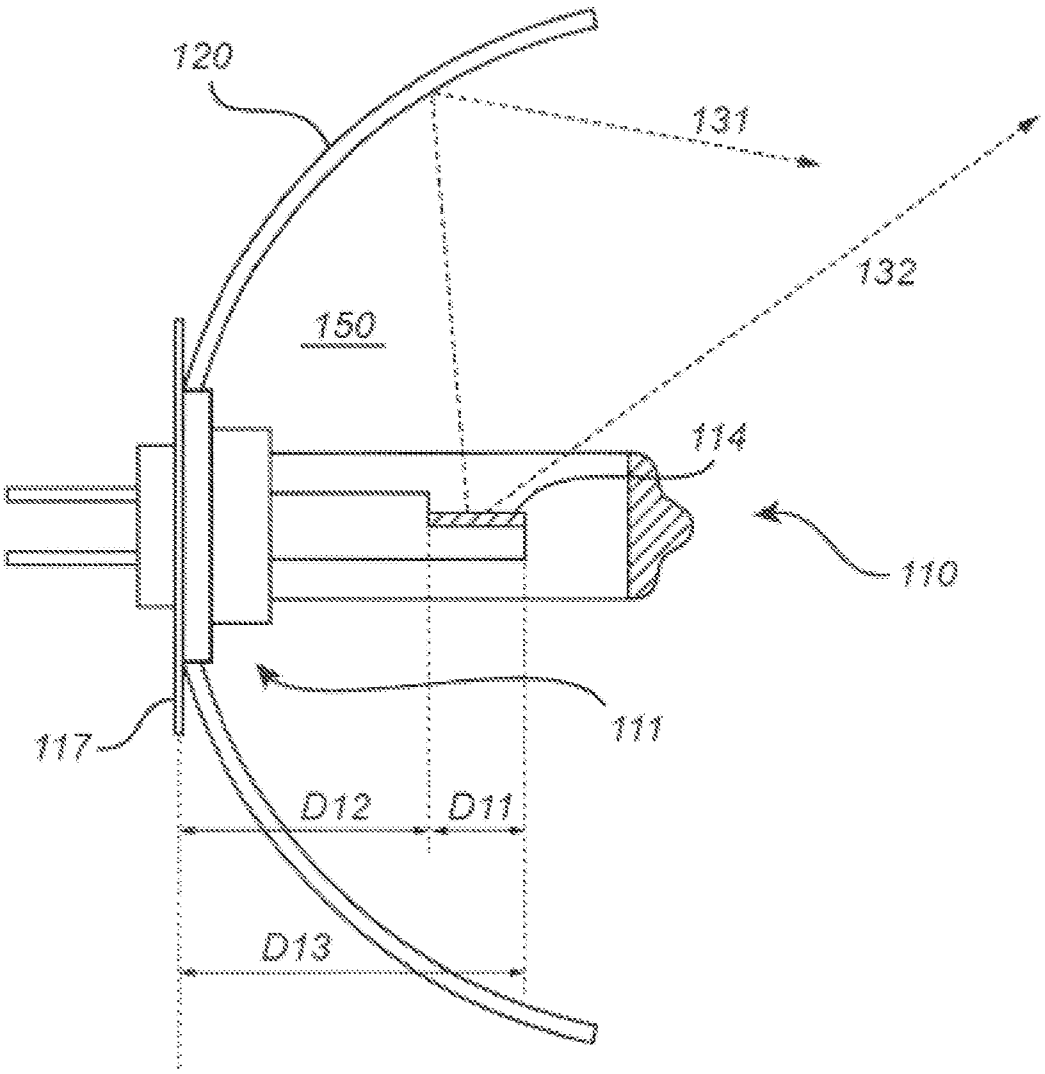
prior art FIG. 1
FIG. 1 is a schematic cross section of a halogen H7 lamp.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element such as a layer, region, or substrate is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

For an LED retrofit providing a fully functional replacement of a conventional lamp, besides the general light technical requirements, the LED retrofits may be further constrained by the continued use of the other system components. Besides light technical data, such as luminance and angular light distribution, mechanical boundary conditions as to size and shape may arise as the LED retrofit has to fit into the same installation space as the conventional lamp it replaces. Reproducing light technical data of a halogen or a gas-discharge lamp may be complicated for an LED for various reasons. For example, LEDs, may have a different light emission pattern than conventional lamps. Whereas conventional lamps may emit light in 360°, LEDs may have a Lambertian emission pattern. Additionally, because of the requirement to keep junction temperatures low despite their waste heat, LEDs may require heatsinks. This may not only aggravate total installation space requirements but may also render an LED mounted on its substrate bulkier than the filament of a halogen lamp or the arc of a gas-discharge lamp.

FIG. 1 is a schematic cross section of a halogen H7 lamp. In the example illustrated in FIG. 1, the one-filament H7 lamp 110, depending on the vehicle headlight reflector, is used for generating a low or a high-beam.

Figure 2:
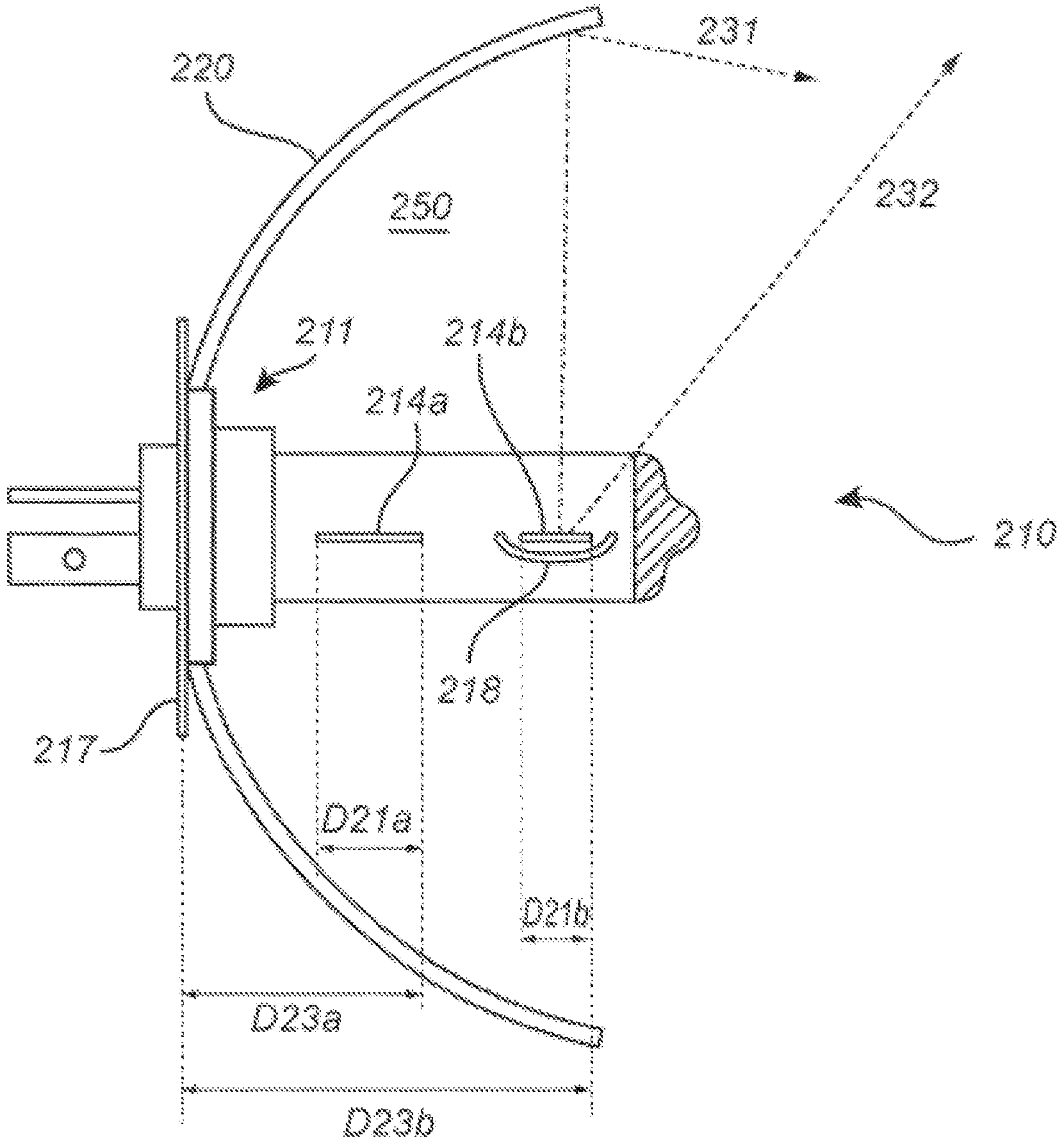
prior art FIG. 2
FIG. 2 is a schematic cross section of a two-filament halogen H4 lamp.

FIG. 2 is a schematic cross section of a two-filament halogen H4 lamp. In the example illustrated in FIG. 2, the two-filament H4 lamp 210 has a base-near filament 214*a* that may be used for generating a high beam and a top-near filament 214*b* that may be used for generating a low beam (together with shutter 218) in a vehicle headlight reflector.

Lamps, such as the H7 and H4 lamps illustrated in FIGS. 1 and 2 are still widely used in currently deployed cars. Their replacement by more energy efficient LED lamps is not just of high economic interest but also of considerable environmental benefit. Such lamps may be described in more detail in U.S. Pat. No. 10,161,614, which is hereby incorporated by referenced herein.

Vehicle headlight reflectors for conventional lamps, such as the H7 and H4 lamps of FIGS. 1 and 2, may be designed based on standardized properties of these lamps. This may include mechanical properties, such as size, shape, and fixation features, as well as light technical. The reflectors may be designed assuming, for example, a standardized size, shape, and position of the light sources of these lamps (e.g., the filaments 114, 214*a*, 214*b* of the H7 and H4 lamps of FIGS. 1 and 2). Many countries fix these requirements to the lamps in specific regulations. Of particular importance, such as for Europe, Japan and the USA, may be the United Nations ECE regulations, such as, ECE Regulation No. 37 for filament lamps and ECE Regulation No. 99 for gas-discharge lamps.

The light sources as filaments 114, 214*a*, 214*b* of the H7 and H4 of FIGS. 1 and 2 may be aligned with reference to the fixation features of the lamps. For the H7 and H4 illustrated in FIGS. 1 and 2, the light sources as filaments may be aligned in particular with reference to the centering rings 117 and 217 of FIGS. 1 and 2. The vehicle headlight reflectors may be designed with reference to their fixation features for the lamps in the reflector neck, thus, in particular to the feature taking up the centering ring of the lamp. By this, the relative position of the lamp's light source to the reflectors reflective surface may be known to the reflector designer. Coarsely, the reflector designer may care for the light source being in the reflector's focal point. Many modern high-end reflectors, besides such basic requirement, may use complex shapes of the reflective surface to optimize beam properties, such as a long range for the high beam, but also for the low beam (e.g., on the drivers lane), and, of particular importance for the low beam, avoidance of glare for oncoming drivers. Many countries prescribe tight requirements on such and similar beam properties, including, for example, glare avoidance for the low beam.

For enabling the reflector design, lamp regulations may specify tolerance intervals for the lamps. For example, after defining a reference axis and reference plane, limit values may be given, such as for eccentricity and inclination of the light source (e.g., the filament for halogen lamps). In particular, a tolerance box may be defined confining a size, shape, and position of the light source. For example, the filaments 114, 214*a*, 214*b* of the H7 and H4 of FIGS. 1 and 2, according to the regulations for them, may be required to lie within such tolerance box.

Such tolerances boxes may typically be asymmetric such that the position of a base-side end of the light source has a lower tolerance than the top-side end. For example, ECE Regulation No. 37, for an H7 halogen lamp, specifies the axial position of the filament base-side end ("e measure") with a tolerance of 0.1 mm, and the axial extension of the filament ("f measure") also with a tolerance of 0.1 mm, resulting in an added tolerance of 0.1+0.1=0.2 mm for the top-side end of the filament. Using such lower tolerance at the base-side end, reflector designers may typically design the reflector's focus close to the base-side end.

LED retrofit lamps are relatively new in the market. Legally, regulations for conventional lamps do not currently apply to LED retrofits, but regulations for LED retrofits are still to be enacted. Currently, in the countries applying regulations, limited allowances exist only for a few LED retrofit types and are restricted to a limited number of vehicle headlight types.

As mentioned above, LED retrofits replace conventional lamps, coarsely spoken, one-to-one. In other words, the LED retrofits not only have to physically fit in the installation position of the conventional lamp but also have to obtain an acceptable beam shape in the otherwise unchanged vehicle headlight. To do so, conventional LED retrofits try to reproduce as closely as possible the structure of the conventional lamp to be replaced, such as by placing the light emitting area of the LEDs within the tolerance box of the conventional lamp's light source.

Concerning the axial position of the light emitting area of an LED retrofit, the above discussed asymmetry of the tolerance boxes may be taken into account. For example, if the axial extension of the light emitting area of an LED retrofit differs from that of the to be replaced conventional lamp, the lower tolerance at the base-side end of the tolerance box may be given preference, and the base-side end of the light emitting area of the LED retrofit may be placed at the base-side end of the tolerance box. Larger deviations at the top-side end, even if larger than the specified tolerances of the tolerance box, may then be accepted under the assumption that deviations at the top-side end would be less detrimental for the optical system of the vehicle headlight.

For alleviating such issue of axial adherence to the tolerance box, U.S. Pat. No. 10,161,614, incorporated by reference above and of same applicant, addressed the issue of an LED light source, there an axial arrangement of LEDs, being shorter than a halogen lamp's filament. The document proposed providing a mirror at the top-side end of the LED arrangement to virtually extend the light-emitting area of the LED arrangement beyond its top-side end. Following the usual asymmetry considerations, the document placed the base-side end of the LED arrangement at the same axial position as the base-side end of the filament of the halogen lamp to be replaced. The virtual extension of the LED arrangement by the mirror 415*a*, 415*b* may then create a kind of fuzzy top-side end of the LED arrangement assumed to be largely equivalent to the top-side end of the halogen lamp's filament.

Concerning the transversal position of the light emitting area of an LED retrofit, due to the above discussed bulkiness of LED retrofits, and as discussed in more detail below, staying within the tolerance box may be even more technically challenging. Usually, prior art LED retrofits simply accepted that their light emitting areas were transversally far outside of the tolerance boxes.

Another issue with LED retrofits may be the different angular radiation pattern. LEDs may only emit in a half space (without further means in a Lambertian pattern) whereas filaments and gas-discharge arcs may emit in the full 360° space. This may typically be addressed by placing two LED arrangements 414*a*, 414*b* with opposing emission directions on opposite faces of a substrate 412, as shown, for example, in FIG. 3, which illustrates a cross section of an LED retrofit 410 for an H4 lamp.

Figure 3:
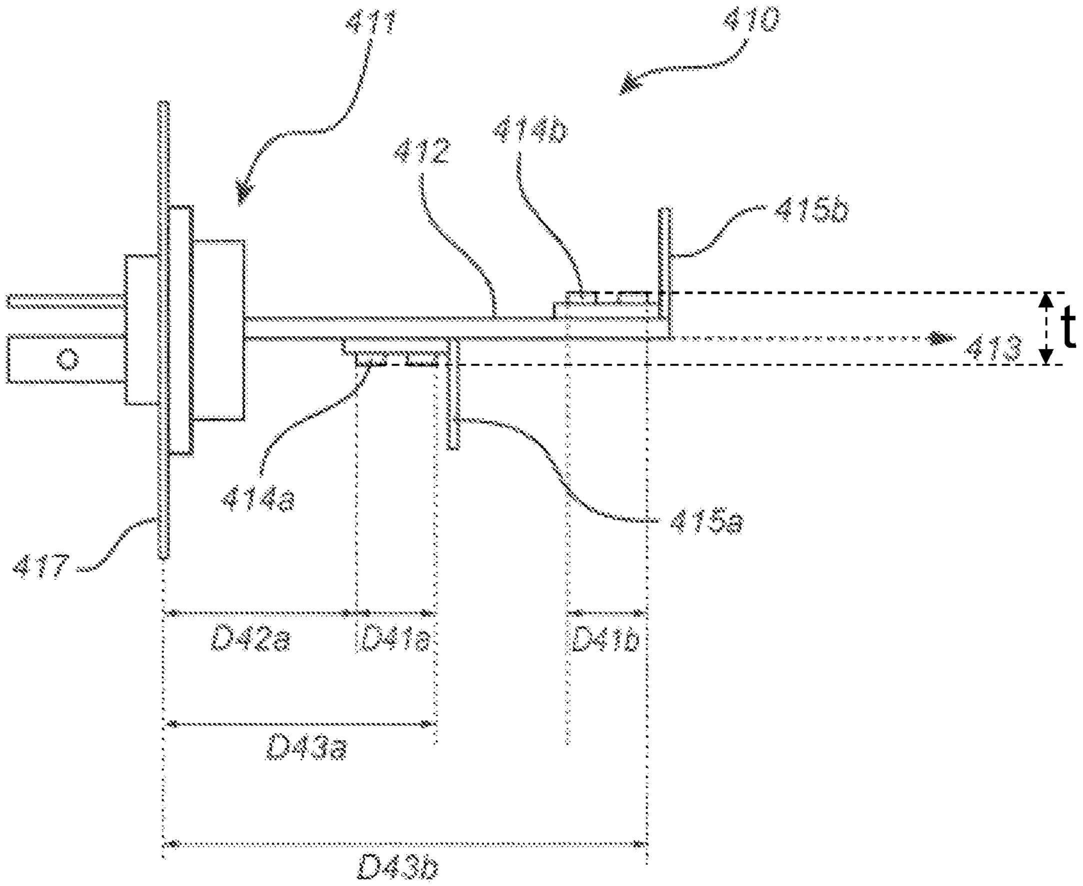
prior art FIG. 3
FIG. 3 is a schematic cross section of an LED retrofit for an H4 lamp.

FIG. 3 is a schematic cross section of an LED retrofit for an example H4 lamp 410. In the example illustrated in FIG. 3, the LED retrofit lamp 410 includes a connector 411 for connecting the LED retrofit lamp 410 to a reflector and a substrate 412 that runs along a longitudinal axis 413. The connector 411 may include centering ring 417. In such construction, the substrate 412 may have to act as a heat spreader for the LEDs. Therefore (and also for mechanical stability), substrate 412 may have a minimum thickness leading to a minimum distance t of light emitting areas of the LED arrangements 414*a*, 414*b* being apart from each other. Unfortunately, such distance t, in a sense the thickness of the (composite) LED light source, may be larger than the diameter of a filament or a gas-discharge lamp, and also larger than the transversal dimension of their tolerance boxes. Each of the LED arrangements 414*a*, 414*b* may be adjacent a respective reflective element/mirror 415*a*, 415*b*. In FIG. 3, D41*a*, D41*b* represent an axial extension or length of the LED arrangements 414*a*, 414*b*, D42*a* represents a distance from the centering ring 417 to a beginning/base-side end of a base-side (low beam) LED arrangement, and D43*a*, D43*b* represent distances from the centering ring 417 to ends (e.g., top-side ends) of the LED arrangements 414*a*, 414*b*. This is schematically illustrated in FIG. 4.

Figure 4:
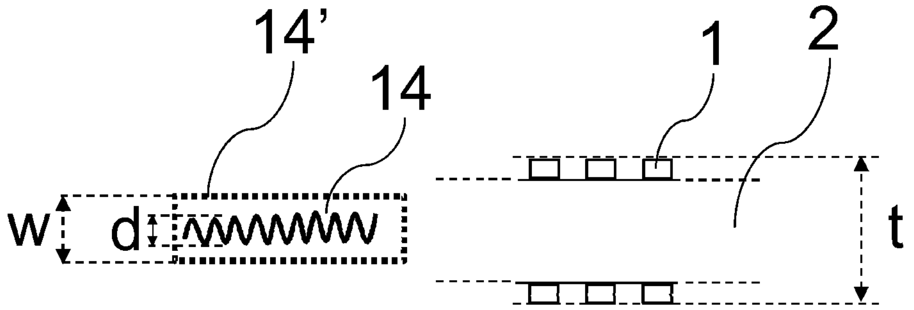
FIG. 4 is a diagram that shows in schematic cross section the relative size and positional relations between a conventional lamp filament and the LED arrangements of an LED retrofit.

FIG. 4 is a diagram that shows in schematic cross section the relative size and positional relations between a conventional lamp filament and the LED arrangements of an LED retrofit. In the example illustrated in FIG. 4, on the left side, a filament 14 of a to be replaced halogen lamp is centered in its tolerance box 14'. Diameter d of the filament 14 may be smaller than the transversal dimension/width w of the tolerance box 14'. On the right side, LEDs 1 may be mounted on opposing faces of the substrate 2. The transversal separation t of the light emitting areas of opposing LEDs 1 (e.g., width or thickness t of the LED light source) may be larger and in many cases much larger than the diameter d of the filament 14 and even larger or much larger than the width w of the filament's tolerance box.

Such larger transversal dimension/width/thickness may result in suboptimal beam shapes for the high and low beams. The large transversal distance t between light emitting areas of LEDs 1 may cause a gap without light generation in between (e.g., in the substrate 2), which gap, depending on the vehicle headlight reflector, may be imaged on the otherwise illuminated areas on the road. In other words, it may lead to dim areas in the headlight beam. Such dim areas may be annoying and even dangerous, especially for the high beam. Furthermore, with the light emitting areas of LEDs 1 outside of the tolerance box 14', the light source may be off the focus of the reflector where the reflector designer may not have expected any light. This may lead to an unplanned distribution of light intensity in the headlight beam and, depending on reflector type, may result in considerable light above the bright-dark boundary for the low beam, thus glaring oncoming traffic.

In U.S. Pat. No. 10,458,613, which is hereby incorporated by reference herein, addressed this issue by reversing the beam direction of the opposing LED arrangements. In other words, the LED arrangements may not radiate to the side of the substrate they are mounted on but, instead, through a transparent part of the substrate to the opposite side. This may bring the light emitting surfaces of the LED arrangements closer to each other. Such solution strongly deviates from the standard construction of LED retrofits.

Embodiments described herein, however, address the issue without need to deviate from proven construction principles of LED retrofits. The ability to do same about by analyzing the beam forming from a conventional LED retrofit in a reflector designed for a conventional lamp.

Figure 5:
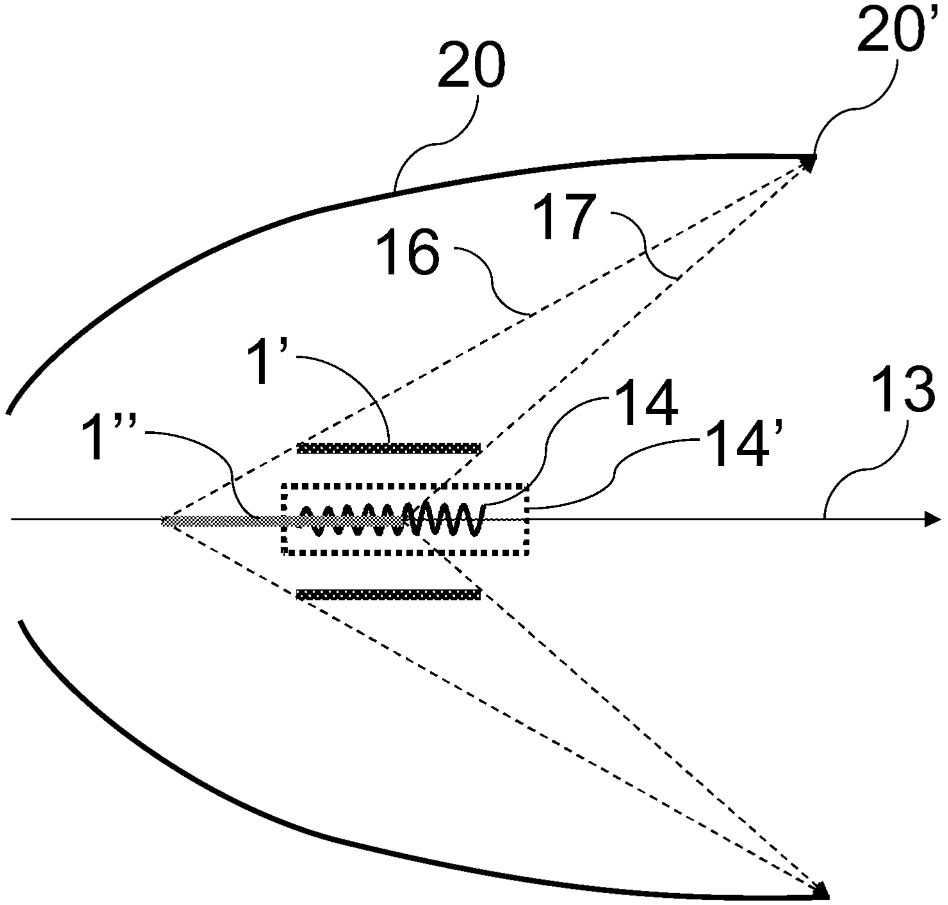
FIG. 5 is a schematic cross section for an LED retrofit showing the size and positional relationships together with optical considerations in a vehicle headlight reflector.

FIG. 5 is a schematic cross section for an LED retrofit showing the size and positional relationships together with optical considerations in a vehicle headlight reflector. More specifically, FIG. 5 shows the position of light emitting areas 1' of opposing LED arrangements, like in FIG. 4, in comparison to the position of filament 14 (and its tolerance box 14') of a to be replaced halogen lamp, in reflector 20. In the beamforming from a conventional LED retrofit in a reflector, it was recognized that, for many reflector types, the outer peripheral parts of the reflective surface, such as the parts near the edge 20' of the opening of reflector 20, may be vital for a long beam range of the high beam and/or for a sharp cutoff (bright-dark boundary) of the low beam. It was also recognized that, as seen from such outer peripheral edge 20', LED light emitting areas 1' offset from reference axis 13 may appear shifted towards the reflector neck. In other words, light emitted by LED light emitting areas 1' positioned with their base-side ends on the same transversal position as filament 14 may appear, as seen from edge 20', to emanate from a virtual light emitting area 1" on the reference axis 13, which, versus the true light emitting areas 1', is enlarged and shifted opposite to the reference direction 13.

However, as described above, maintaining low tolerances at the base-side end of the light emitting area may be of vital importance for an optimal beam shaping by reflectors for conventional lamps. For many reflector types, such inward shifting beyond the tolerance box base-side end may result in shortening the range of high beams and in glare generation (and less brightness immediately below the targeted cutoff line) for low beams.

Figure 6:
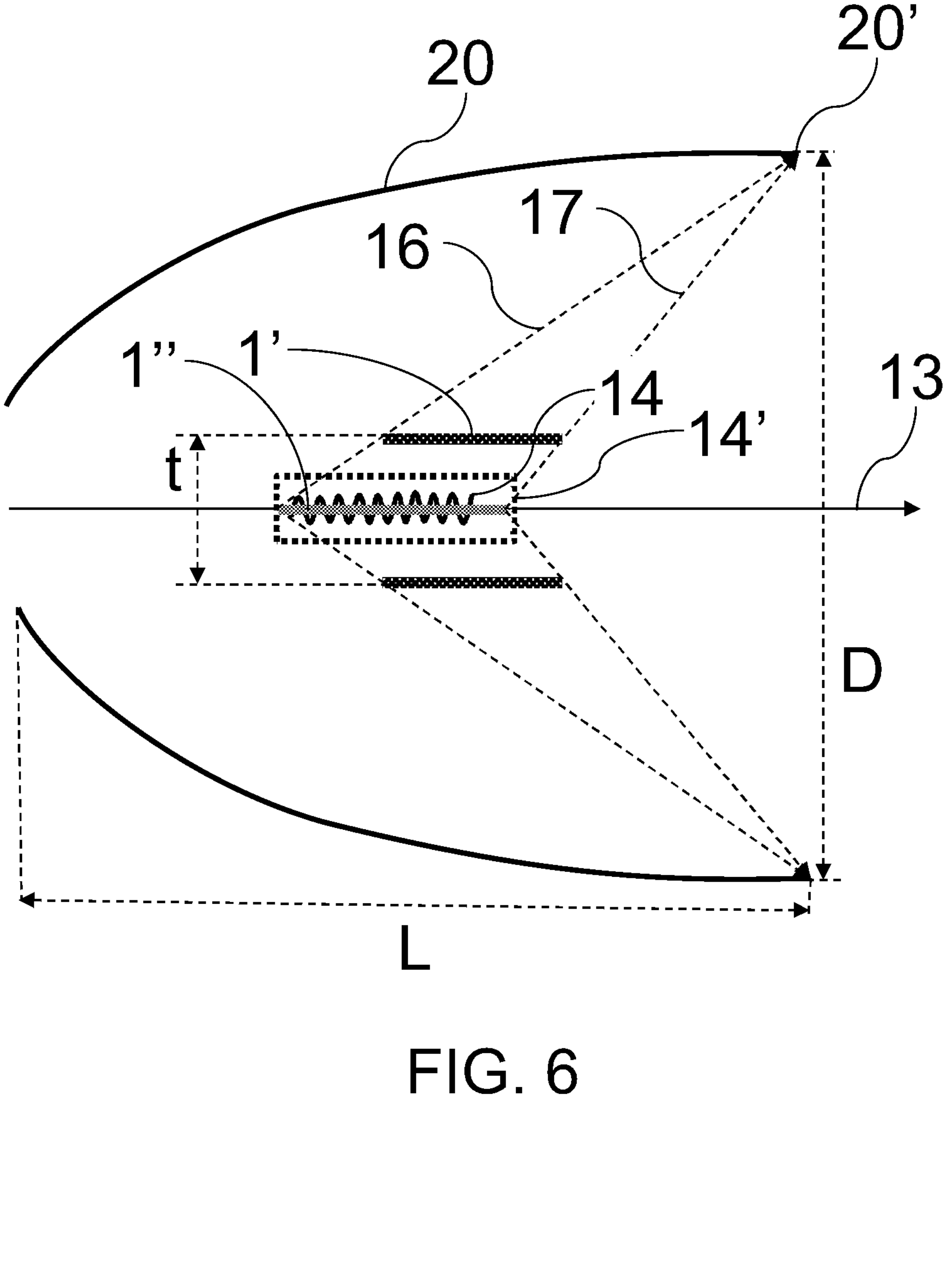
FIG. 6 is a schematic cross section for an example LED retrofit showing the size and positional relationships together with optical considerations in a vehicle headlight reflector.

It was also recognized that the virtual light emitting area 1" may be moved into the tolerance box 14' by shifting the (true) light emitting areas 1' towards the opening of reflector 20. This is schematically illustrated, in cross-section, in FIG. 6. As can be seen in FIG. 6, the light emitting areas 1' have been shifted right (towards the reflector opening) until the base-side end of virtual light emitting area 1" coincided with the base-side end of tolerance box 14'. In this example, the top-side end of virtual light emitting area 1" then also coincided with the top-side end of tolerance box 14'. In general, the specific relative positions may depend, on the one hand, on the other dimensions of the LED retrofit lamp, such as the transversal separation of the LED light emitting areas 1', and, on the other hand, on the reflector dimensions, such as on the reflector length L and the reflector opening's diameter D.

For example, a shape and position of a light emitting area of an LED arranged of an LED retrofit lamp may be selected such that the base-side end of its virtual light emitting area has an axial distance of at most 0.2 mm from the tolerance box base-side end opposite to the reference direction and the top-side end of the virtual light emitting area has an axial distance of at most 0.5 mm from the tolerance box top-side end in the reference direction. For many reflector types, such selected shape and/or position will yield satisfactory results and, with further optimization, may allow LED retrofits to produce beam shapes comparable or even superior to the conventional lamps they are designed to replace.

Figure 7:
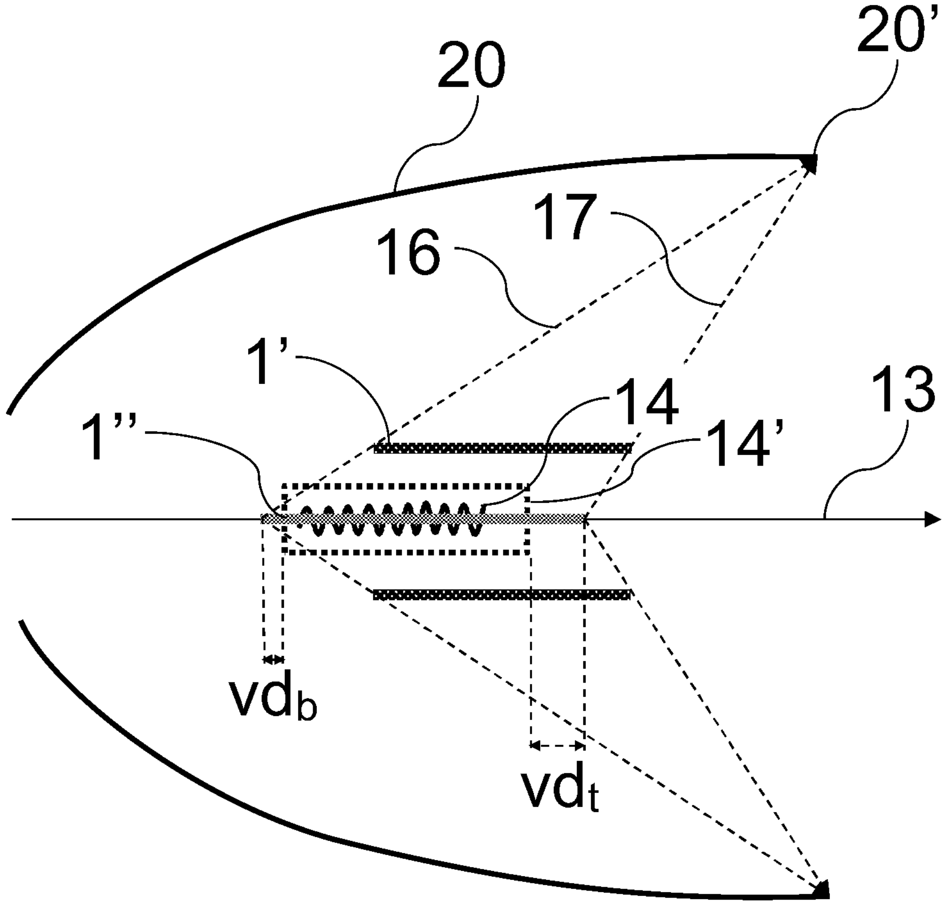
FIGS. 7 and 8 are schematic cross sections showing the definition of axial position parameters for an example LED retrofit.

This situation is schematically illustrated, in cross section, in FIG. 7. In the example illustrated in FIG. 7, virtual light emitting area 1" extends distances $vd_b$, $vd_t$ beyond the tolerance box 14'. Distance $vd_b$ may be measured from the tolerance box base-end side toward the reflector neck, and the distance $vd_t$ may be measured from the tolerance box top-end side towards the reflector opening. In embodiments described herein, it may be desirable to limit $vd_b$ to at most 0.2 mm and $vd_t$ to at most 0.5 mm. As described above, due to the asymmetry of the tolerance box, the base-side limit may be tighter or even much tighter than the top-side limit.

Even better beam shapes may be obtained for some reflector types by matching the virtual light emitting area even closer to the reference box. In some embodiments, the values for the base-side distance $vd_b$ may be further limited such that, in these embodiments, the base-side distance $vd_b$ may be at most 0.0 mm and −0.1 mm, which may match with the base-side tolerance box end or even moving 0.1 mm into the tolerance box, which, for the H7 halogen lamp, may be the nominal position of the base-side filament end as per regulation ECE 37. Similar for the top-side distance $vd_t$, in some embodiments, the top-side distance $vd_t$ may be at most 0.3 mm, 0.1 mm, 0.0 mm, and −0.1 mm, moving towards the reference box over matching with the top-side tolerance box end or even moving 0.1 mm into the tolerance box, which, for the H7 halogen lamp, again, may be the nominal position of the top-side filament end as per regulation ECE 37.

It is also recognized that absolute position intervals, such as position intervals independent from the particular reflector the LED retrofit is targeted for, will yield satisfactory results for many reflector types. For example, the light emitting area of the LED arrangement of an LED retrofit lamp may be positioned with its base-side end having an axial distance of at least 0.1 mm from the tolerance box base-side end in the reference direction and with its top-side end having an axial distance of at most 1.5 mm from the tolerance box top-side end in the reference direction. For example, unlike the virtual light emitting area, the (true) light emitting area, with its base-side end, should not extend beyond the tolerance box but should be shifted towards the reflector neck.

Figure 8:
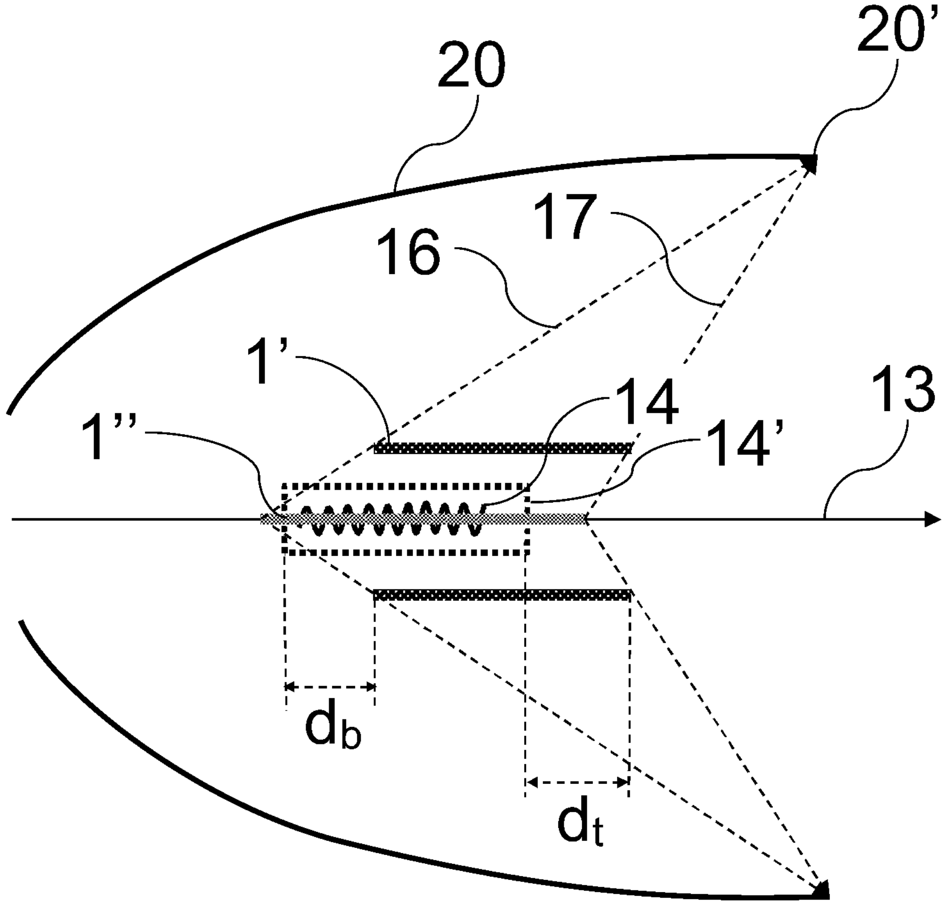

This situation is schematically illustrated, in cross section, in FIG. 8. In the example illustrated in FIG. 8, the light emitting area 1' may be shifted by distances $d_b$, $d_t$ versus tolerance box 14'. Distance $d_b$ denotes a shift of light emitting area's base-end versus the tolerance box base-end, and $d_t$ denotes a shift of light emitting area's top-side end versus the tolerance box top-side end, both measured towards the reflector neck, such as in reference direction 13. As mentioned above, $d_b$ may be limited to at least 0.1 mm and $d_t$ may be limited to at most 1.5 mm. As described above, due to the asymmetry of the tolerance box, the base-side limit may adhere much closer to the tolerance box than the top-side limit.

Corresponding to tighter adhering of the virtual light emission area to the tolerance box, tighter positioning of the (true) light emitting area may yield even better beam shapes for some reflector types. The base-side distance $d_b$, may be at least one of 0.3 mm, 0.6 mm, 1.0 mm, 1.4 mm, and 1.8 mm, and the top-side distance $d_t$, may be at most one of 1.0 mm, 0.5 mm, 0.3 mm, and 0.1 mm.

As already described, the axial position $d_b$ of the base-side end of light emitting area 1' may be of particular importance for the beam quality. Values between 0.8 mm and 1.0 mm may achieve very satisfactory results at least for some reflector types. This may even be improved by choosing the length (e.g., the axial extension of the LED arrangement) between 3.0 mm and 3.5 mm, and/or, specifically, as 3.2 mm.

The absolute values may have the advantage that the LED retrofit lamp may not need to be specially designed for each vehicle light reflector in the market but may work for many existing reflector types independent from their dimensional details. In that context, it may be worth mentioning that while, for ease of understanding, the tolerance boxes 14' in the figures are shown within reflectors 20, the definition of tolerance box may be independent of the reflector. In other words, dimensions of conventional lamps, including the tolerance boxes of their filaments and gas-discharge arcs, may be defined within the conventional lamps themselves, specifically with respect to alignment features comprised by the centering rings 117, 217 shown in FIGS. 1 and 2, and functionally taken over by the centering rings 417 (see FIG. 3) of LED retrofits. The centering rings (also referred to as fixation, alignment, and/or keying means) may fully define the conventional lamps' mounting position within the reflectors, and, in the same way, the centering rings of the LED retrofits may define their mounting position within the reflectors. By the equivalence of the centering rings of conventional lamps to that of LED retrofits, shape, size and position of the reference boxes of conventional lamps may be carried over to the LED retrofits.

The connection between the methods of manufacturing an LED retrofit as described herein and the absolute values just given can be illustrated with an example using dimensions of an H7 halogen lamp to be replaced in a typical reflector designed for the H7. Measured from the reference plane, the base-side end of the H7 tolerance box may have a distance ("light center length") of 25 mm to that. Continuing measuring from the reference plane, a typical H7 reflector has a length (distance from reference plane to reflector opening) of 60 mm. The diameter of such reflector is typically 130 mm. The distance of the light emitting areas of a disclosed LED retrofit for the H7, such as the thickness t of FIG. 4, may be taken as 2.8 mm. Applying the methods described herein in the embodiment of matching the base-side end of the virtual LED light emitting area with the tolerance box base-side end, such as by choosing $vd_b$=0 mm (FIG. 7), the intercept theorem may allow calculating the axial shift of the base-end of the (true) light emitting area, such as of $d_b$ (FIG. 8).

$$((\text{Reflector diameter})/2)/(\text{thickness}/2)=((\text{reflector length})-(\text{light center length}))/d_b.$$

$$130/2.8=(60-25)/d_b.$$

$$d_b=(60-25)/(65/2.8)=35/130*2.8=0.75\text{ mm}.$$

In this example, thus, matching the base-side end of the virtual LED light emitting area with the tolerance box base-side end may correspond to a shift of the base-side end of the (true) light emitting area by 0.75 mm.

The axial placement of the LEDs in the LED arrangement may be practically made by appropriately controlling the LEDs' pick-and-place machinery. However, as just mentioned, in the end, it is the axial distances of the LED arrangement to the centering ring (distances D11, D12, D13, D21_a_, D21_b_, D23_a_, D23_b_ in FIGS. 1 and 2 for the halogen lamps, and distances D41_a_, D41_b_, D42_a_, D43_a_, D43_b_ in FIG. 3 for the LED retrofits) that may be of importance. Thus, instead of changing the positions of LEDs 414_a_, 414_b_ on substrate 412, it may be much simpler to change the axial position of the centering ring 417 (see FIG. 3). This may be particularly easily practically realized by using centering rings of various thicknesses for selecting the axial position of their alignment features. Alternatively, the centering rings may be fixed, for example by gluing at the selected axial position.

Of interest might also be a "late" selection of the centering ring's axial position, such as by the end user, as such might increase the usefulness of the LED retrofit for a larger spectrum of reflector types. This might be realized by bundling the LED retrofit with exchangeable centering rings, such as ones having different thicknesses. However, it might be much easier for the end user when no separation of the centering ring from the LED retrofit is required, by changing the axial position, such as by simply rotating the centering ring to another angular position. Some current LED retrofits may already foresee rotatable centering rings for selecting an optimal angular position of the LED arrangements. Further, two opposing LED arrangements, like in FIG. 4, may not fully reproduce the homogenous 360° light emission of a conventional lamp, but, typically, may have intensity maxima transversal to the LEDs' mounting plane. Some reflectors might perform better with such intensity maxima at a particular position. Such might then be combined with an axial shift of the centering ring, such as by foreseeing resting positions on notches and elevations defining various axial levels.

The LED retrofit described herein may replace any conventional lamp but might be particularly useful for replacing one of an H1, H3, H4, H7, H11, H13, HB3 (9005), HB4 (9006), HB5 (9007), or HIR2 halogen lamp. Of these, the H7 and the H4 may not be just particularly interesting from a commercial point of view for their vast installation base, but the axial shift of the LED light emission area described herein may also technically allow very high beam qualities.

The embodiments described herein have been shown to be particularly advantageous for reflection type headlights, such as headlights with no projection optics, where the complete imaging of the light source has to be performed by the headlight reflector, which, thus, may heavily rely on finding the light source in the specified position.

Figure 9:
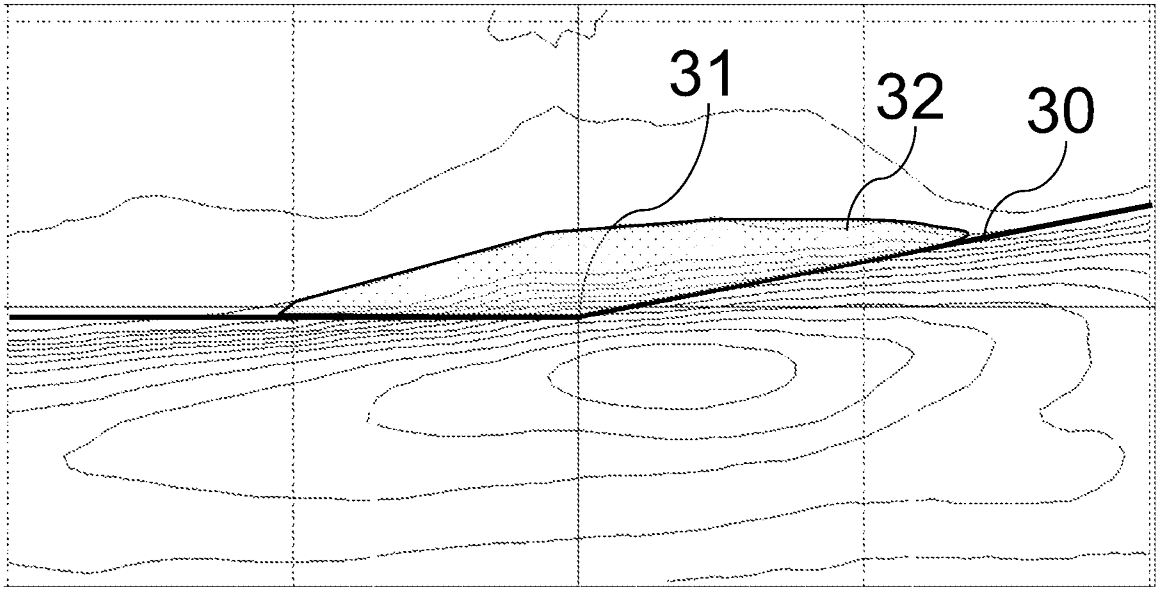
FIGS. 9 and 10 are diagrams that show calculated illumination levels ahead of the vehicle for a conventional LED retrofit and the example LED retrofits for a low beam.
Figure 9:
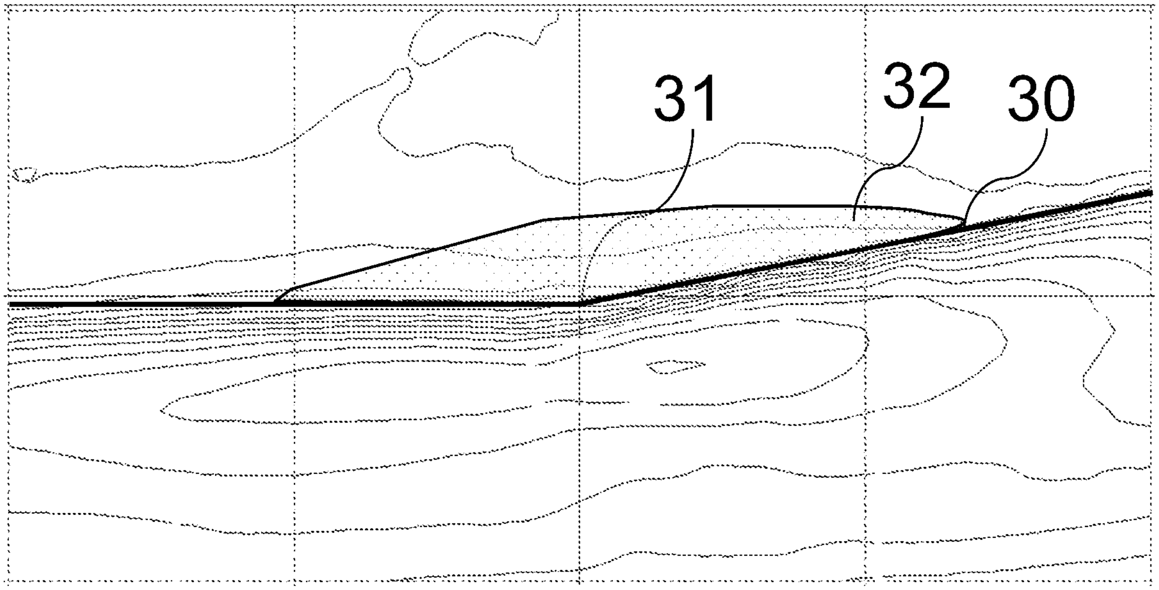

FIG. 9 compares, by an optical simulation calculation, the quality of the bright-dark boundary for a conventional LED retrofit in the upper part (a) with that of an LED retrofit according to embodiments described herein in lower part (b) (using 3.2 mm long (and 1 mm wide) LED light emitting areas, being transversally t=2.6 mm apart, and with its base-side end shifted by $d_b$=1.5 mm versus the tolerance box base-side end). Shown are the intensity isolines on a vertical screen ("H-V space") placed in front of the vehicle headlight of a Fiat 500 having the LED retrofits mounted instead of an H7 halogen lamp for which this headlight was constructed (with the H7 filament having a (nominal) length D11 of 4.1 mm and a diameter d of (targeted and typically) 1.3 mm). The desired cutoff line 30 with its kink 31 between the horizontal left (slightly below the horizontal middle line) and the sloping right half (design for right-lane traffic) is indicated. High quality can be judged from high brightness immediately below the cutoff line 30, for a good illumination towards oncoming traffic and a long low-beam range on the driver's lane, and low brightness, to avoid glaring oncoming traffic, immediately above the cutoff line 30, thus, requiring a steep intensity decrease, and, accordingly, density of isolines when crossing cutoff line 30 from below to above. It can be clearly seen that the LED retrofit in lower part (b) comes close to such ideal. However, in the conventional LED retrofit in upper part (b), isolines may not be parallel to the cutoff line 30, but may cross it at an angle and the density of isolines below the cutoff line 30 is less dense (in particular below the sloped part of cutoff line 30), indicating a reduced low-beam range. Even more detrimental, isolines are shifted above the cutoff-line 30 to a region above and sidewards of kink 31, marked in the figures by dotted region 32. This will provoke serious glare to the oncoming traffic.

Figure 10:
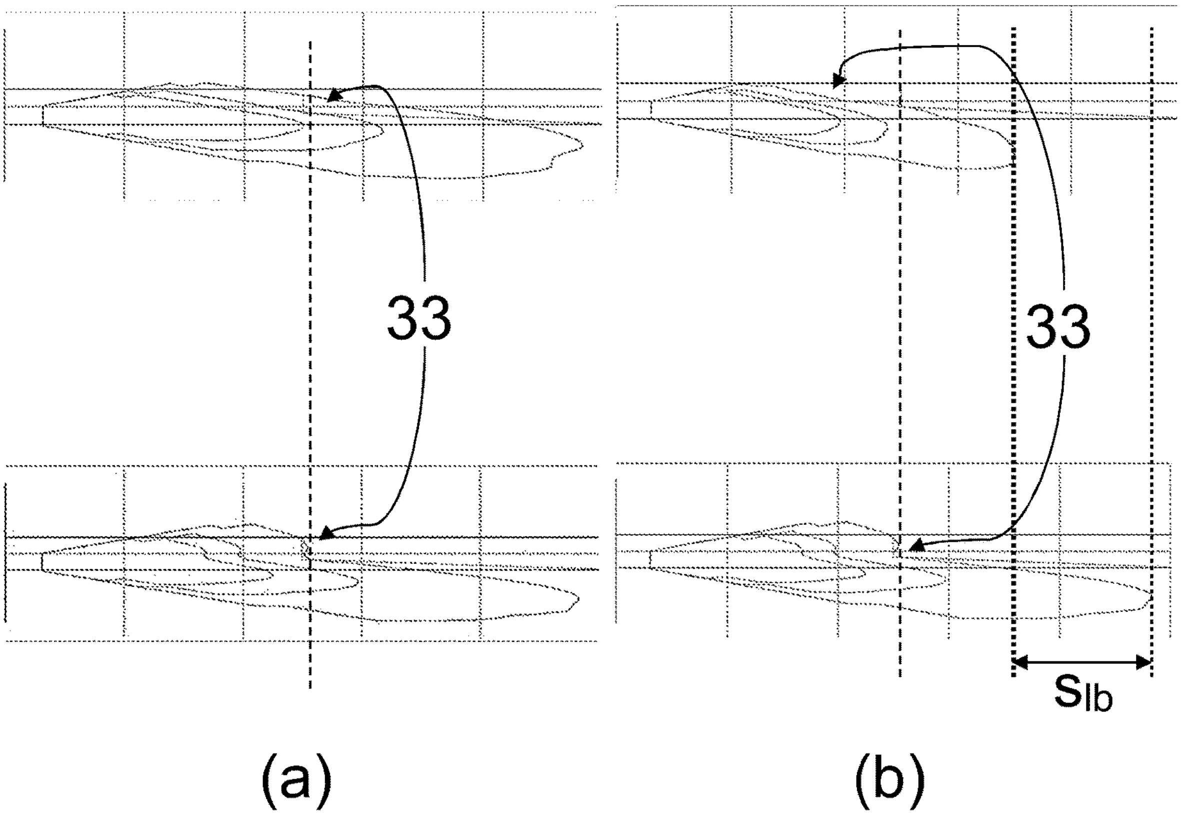

This becomes even clearer in FIG. 10, which shows the intensity isolines as seen in a bird's eye view looking on the road ahead of the vehicle. Again, the upper row shows the conventional LED retrofit, and the lower row shows the LED retrofit according to embodiments described herein. The left column (a) uses the same total amount of light, such as the same luminous flux, for both LED retrofits (as was done in FIG. 9). In the right column (b), the luminous flux of the conventional LED retrofit was reduced to stay below the glare values for the oncoming traffic as prescribed by the ECE regulations. It is clearly visible from these figures that the vehicle headlight with the LED retrofit according to embodiments described herein illuminates the oncoming drivers lane only up to a very short range (see the position indicated by reference sign 33), to stay below the level of the oncoming drivers eyes to avoid glaring, and instead concentrates the light on the own driver's lane for a long low-beam range. The conventional LED retrofit, instead, sends much light into the level of an oncoming drivers eyes, thus causing considerable glare while losing these light portions for illuminating the own driver's lane. Reducing the conventional LED retrofit's luminous flux, to keep the glare level acceptable, may not help either as considerably reducing the low-beam range on the own drivers lane by an amount of $s_{lb}$ of about 30 m.

Figure 11:
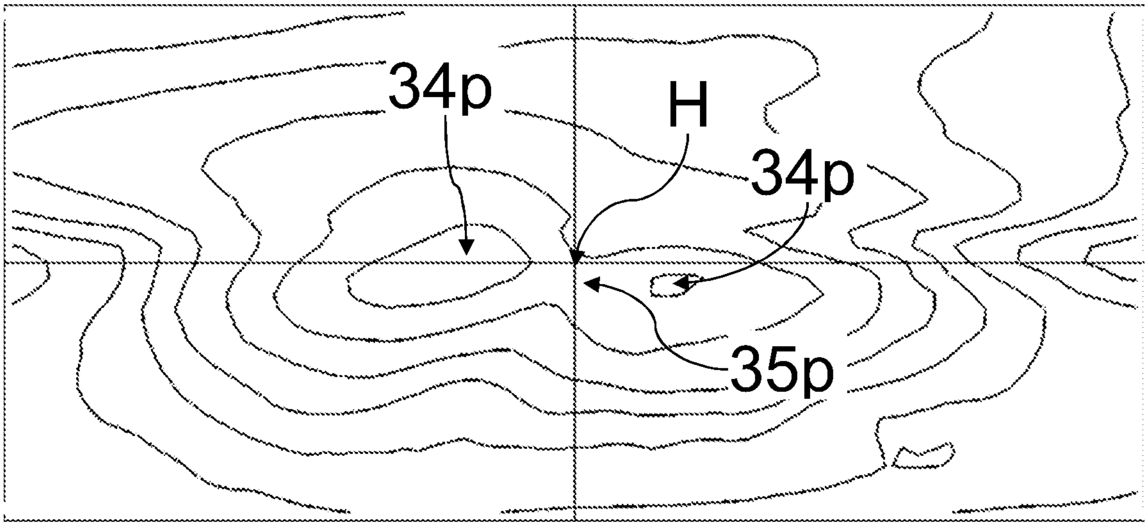
FIGS. 11 and 12 are diagrams that show calculated illumination levels ahead of the vehicle for a conventional LED retrofit and the example LED retrofits for a high beam.
Figure 11:
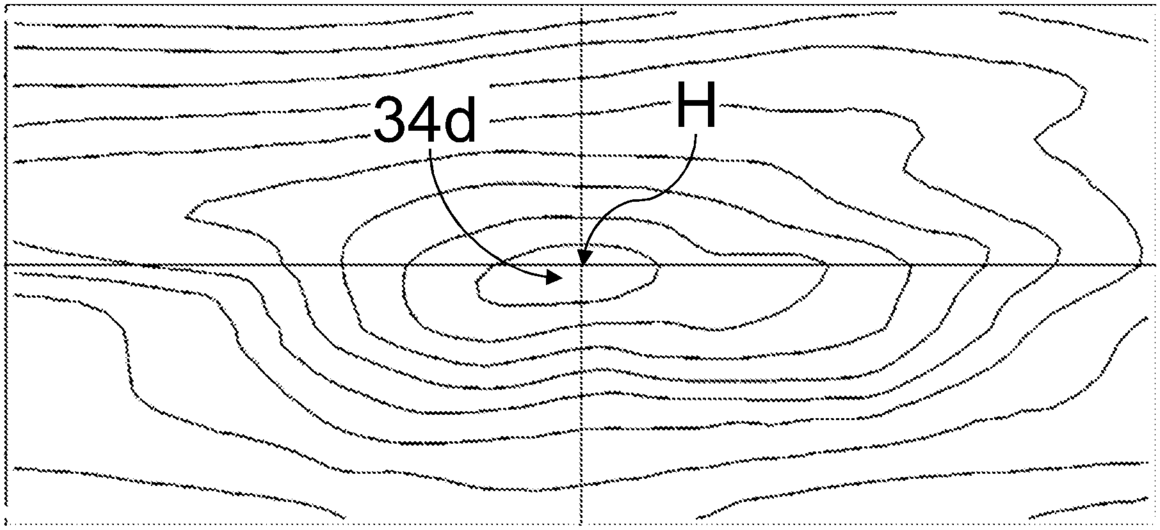
Figure 12:
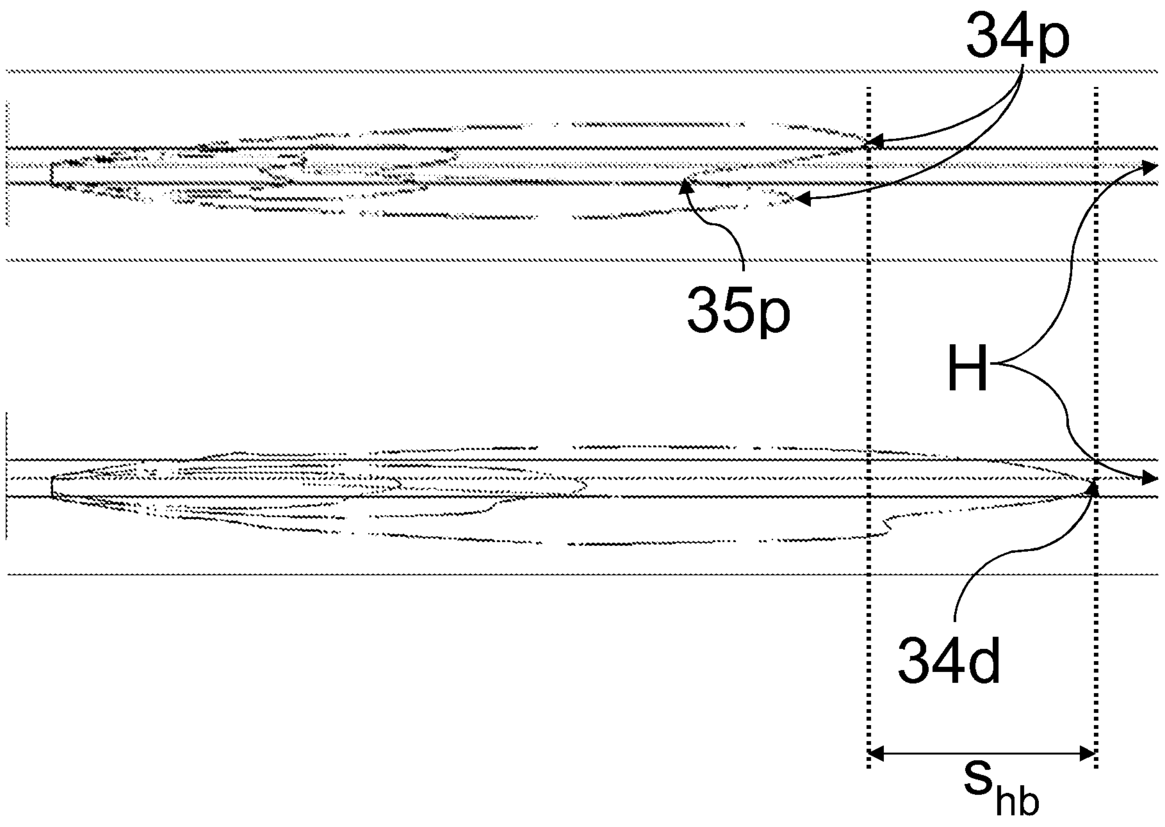

FIGS. 11 and 12 show the analogous vertical screen and bird's eye view as FIG. 9 and the left column of FIG. 10 (conventional LED retrofits and LED retrofits according to embodiments described herein in both figures at the same luminance level), however, this time for an H4 LED retrofit in the headlight of a Renault Twingo in high-beam mode. The same LED arrangements of conventional LED retrofits and LED retrofits according to embodiments described herein as in FIGS. 9 and 10 are used (for the high-beam light source of the H4 LED retrofit). In the conventional H4 filament lamp, the length of the high-beam filament is (nominally) 4.5 mm and its diameter is (targeted and typically) 1.3 mm.

FIG. 11 clearly shows that the vehicle headlight with the LED retrofit described herein may generate an advantageously shaped intensity distribution on the vertical screen with the intensity maximum 34_d_ nearly exactly located at the horizon H (the road mid infinitely far ahead of the vehicle). With the conventional LED retrofit, instead, the intensity distribution may bifurcate at the horizon H. In other words, there may be two intensity maxima 34$p$ left and right from the horizon H (with the main maximum being on the left side). This, however, may mean that the intensity at the horizon H may be a local minimum between the two maxima 34$p$ which the driver will perceive as a dark spot 35$p$. The disadvantageous properties of the conventional LED retrofit may be even more visible in the bird's eye view of FIG. 12 showing clearly the dark spot 35$p$ between the two maxima 34$p$ (and located right from the road middle line leading to the horizon H). Even when considering the larger left side maximum as the prior art LED retrofit's high-beam range, the LED retrofit described herein may increase such high-beam range by nearly $s_{hb}$=50 to 60 m.

From a marketing and technical perspective, the most important difference of the conventional LED retrofits and the LED retrofits described herein in the discussed reflection type vehicle headlights may be in the beam patterns of the LED retrofit described herein being fully compliant with the ECE beam requirements whereas such may not be achieved by the prior art LED retrofit (or may only be achievable for the low beam by reducing luminous flux and, thus, low beam range).

Besides in reflection type vehicle headlights, the LED retrofit lamps described herein might also turn out to be advantageous in so-called bi-projection type headlights. In general, projection type headlights may use a shutter for defining the bright-dark boundary in a low beam and, thus, may be less dependent on the light source position than reflection type headlights. Bi-projection type headlights, however, may re-use the same light source for the high as well as for the low beam. They may employ a movable shutter, bringing the shutter into the light path for the low beam to shade the light above the cutoff line, and moving the shutter out of the light path to use all light for the high beam. Generating a high quality high as well as low beam from the same light source, however, may be technically more challenging and require reflectors as well as projection optics stronger relying on the light source sticking to the specified shape and position. There, the LED retrofits described herein may develop similar advantages than in the discussed reflection type headlights.

Figure 13:
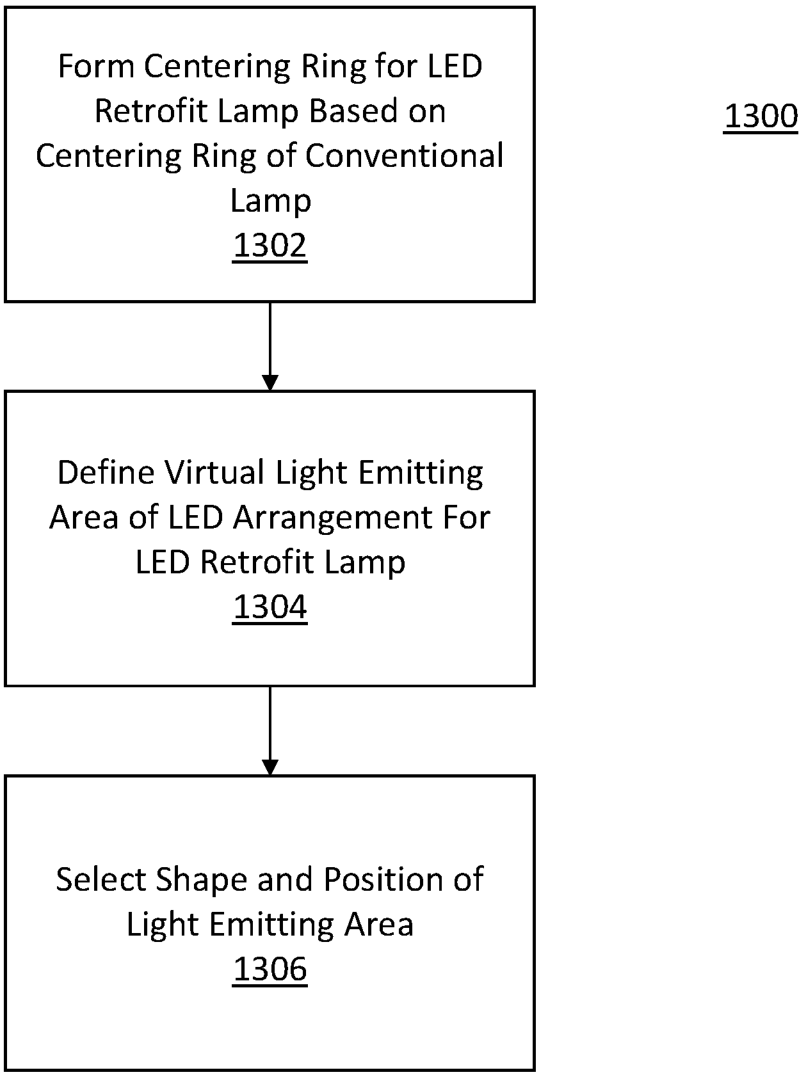
FIG. 13 is a flow diagram of a method of manufacturing an LED retrofit.

FIG. 13 is a flow diagram of a method 1300 of manufacturing an LED retrofit. In the example illustrated in FIG. 13, the method may be a method of manufacturing an LED retrofit lamp for replacing a conventional lamp configured for mounting within a reflector of a vehicle headlight and may include forming a centering ring for an LED retrofit lamp based on a centering ring of a conventional lamp (1302). The centering ring for the LED retrofit lamp may be formed based on a centering ring of the conventional lamp such that the centering ring for the LED retrofit lamp comprises alignment features that define at least one of a mounting position of the LED retrofit lamp within the reflector, the same reference axis as defined by the centering ring of the conventional lamp, the same re reference direction as defined by the centering ring of the conventional lamp, and the same tolerance box as defined by the centering ring of the conventional lamp.

A virtual light emitting area of an LED arrangement may be defined for the LED retrofit lamp (1304). The virtual light emitting area of an LED arrangement may be defined for the LED retrofit lamp as a projection of a light emitting area of the LED arrangement on the reference axis as projected from a point on an edge of an opening of the reflector. The virtual light emitting area of the LED arrangement may extend axially from a virtual LED base-side end to a virtual LED top-side end.

A shape and a position of the light emitting area of the LED arrangement may be selected (1306). In embodiments, the shape and position may be chosen such that the virtual LED base-side end has an axial distance of at most 0.2 mm from the tolerance box base-side end opposite to the reference direction and the LED top-side end has an axial distance of at most 0.5 mm from the tolerance box top-side end in the reference direction.

Figure 14:
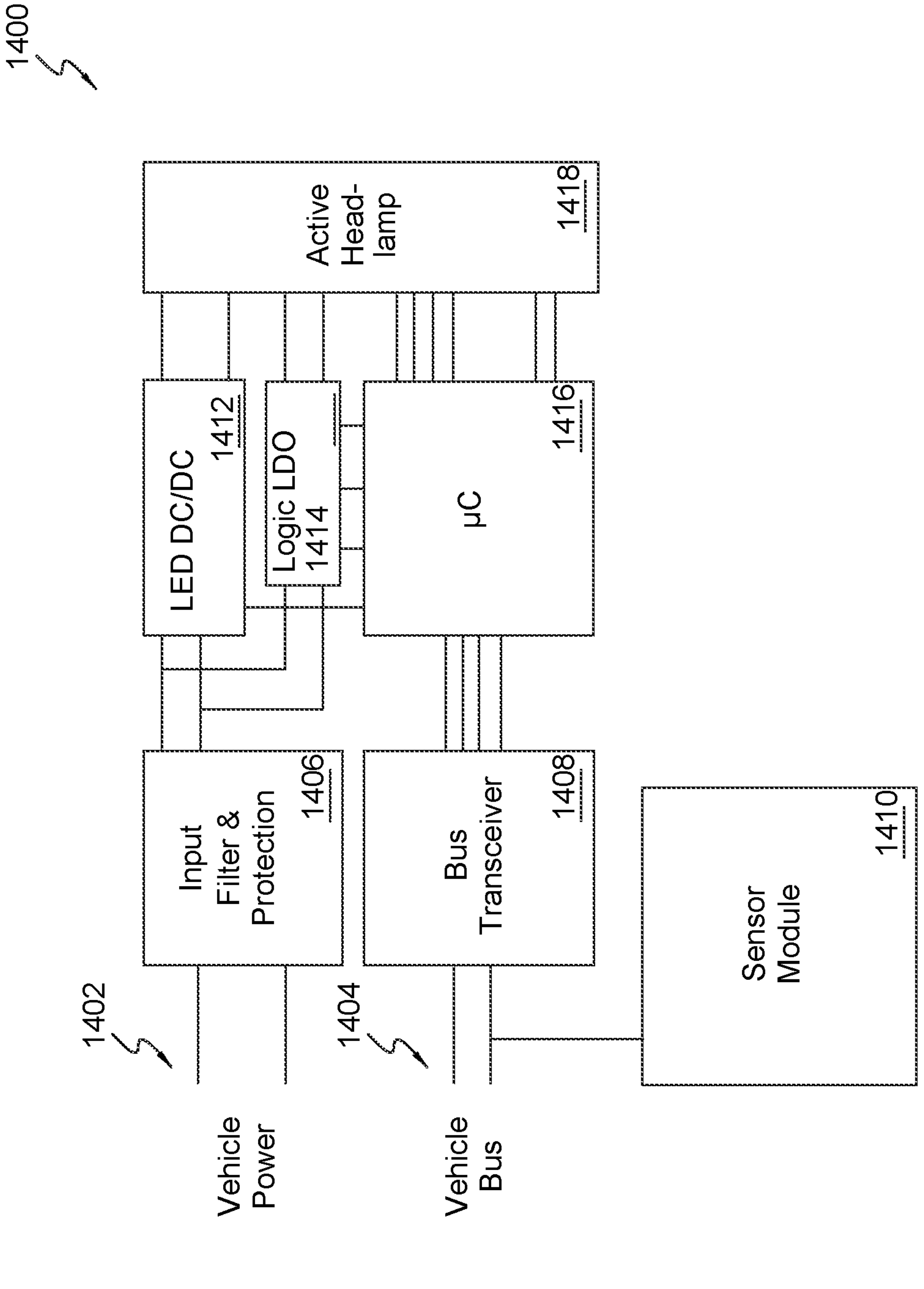
FIG. 14 is a diagram of an example vehicle headlamp system.

FIG. 14 is a diagram of an example vehicle headlamp system 1400 that may incorporate one or more of the embodiments and examples described herein. The example vehicle headlamp system 1400 illustrated in FIG. 14 includes power lines 1402, a data bus 1404, an input filter and protection module 1406, a bus transceiver 1408, a sensor module 1410, an LED direct current to direct current (DC/DC) module 1412, a logic low-dropout (LDO) module 1414, a micro-controller 1416 and an active head lamp 1418.

The power lines 1402 may have inputs that receive power from a vehicle, and the data bus 1404 may have inputs/outputs over which data may be exchanged between the vehicle and the vehicle headlamp system 1400. For example, the vehicle headlamp system 1400 may receive instructions from other locations in the vehicle, such as instructions to turn on turn signaling or turn on headlamps, and may send feedback to other locations in the vehicle if desired. The sensor module 1410 may be communicatively coupled to the data bus 1404 and may provide additional data to the vehicle headlamp system 700 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 1400. In FIG. 14, the headlamp controller may be a micro-controller, such as micro-controller (μc) 716. The micro-controller 1416 may be communicatively coupled to the data bus 1404.

The input filter and protection module 1406 may be electrically coupled to the power lines 1402 and may, for example, support various filters to reduce conducted emissions and provide power immunity. Additionally, the input filter and protection module 1406 may provide electrostatic discharge (ESD) protection, load-dump protection, alternator field decay protection, and/or reverse polarity protection.

The LED DC/DC module 1412 may be coupled between the input filter and protection module 1406 and the active headlamp 1418 to receive filtered power and provide a drive current to power LEDs in the LED array in the active headlamp 1418. The LED DC/DC module 1412 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 1414 may be coupled to the input filter and protection module 1406 to receive the filtered power. The logic LDO module 1414 may also be coupled to the micro-controller 1416 and the active headlamp 1418 to provide power to the micro-controller 1416 and/or electronics in the active headlamp 1418, such as CMOS logic.

The bus transceiver 1408 may have, for example, a universal asynchronous receiver transmitter (UART) or serial peripheral interface (SPI) interface and may be coupled to the micro-controller 1416. The micro-controller

1416 may translate vehicle input based on, or including, data from the sensor module 1410. The translated vehicle input may include a video signal that is transferrable to an image buffer in the active headlamp 1418. In addition, the micro-controller 1416 may load default image frames and test for open/short pixels during startup. In embodiments, an SPI interface may load an image buffer in CMOS. Image frames may be full frame, differential or partial frames. Other features of micro-controller 1416 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 15:
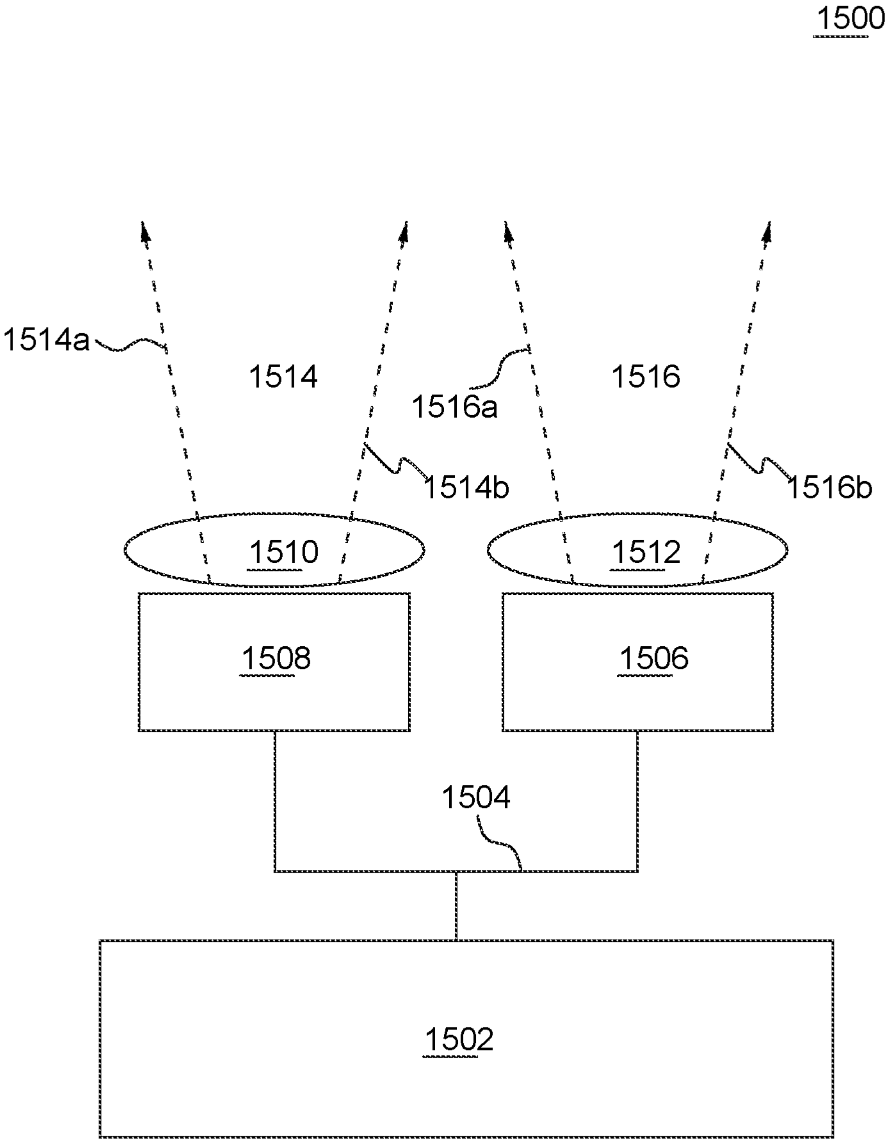
FIG. 15 is a diagram of another example vehicle headlamp system.

FIG. 15 is a diagram of another example vehicle headlamp system 1500. The example vehicle headlamp system 800 illustrated in FIG. 15 includes an application platform 1502, two LED lighting systems 1506 and 1508, and secondary optics 1510 and 1512.

The LED lighting system 808 may emit light beams 1514 (shown between arrows 1514*a* and 1514*b* in FIG. 15). The LED lighting system 1506 may emit light beams 1516 (shown between arrows 1516*a* and 1516*b* in FIG. 15). In the embodiment shown in FIG. 15, a secondary optic 1510 is adjacent the LED lighting system 1508, and the light emitted from the LED lighting system 1508 passes through the secondary optic 1510. Similarly, a secondary optic 1512 is adjacent the LED lighting system 1506, and the light emitted from the LED lighting system 1506 passes through the secondary optic 1512. In alternative embodiments, no secondary optics 1510/1512 are provided in the vehicle headlamp system.

Where included, the secondary optics 1510/1512 may be or include one or more light guides. The one or more light guides may be edge lit or may have an interior opening that defines an interior edge of the light guide. LED lighting systems 1508 and 1506 may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 1508 and 1506 in a desired manner, such as, for example, with a gradient, a chamfered distribution, a narrow distribution, a wide distribution, or an angular distribution.

The application platform 1502 may provide power and/or data to the LED lighting systems 1506 and/or 1508 via lines 1504, which may include one or more or a portion of the power lines 1402 and the data bus 1404 of FIG. 14. One or more sensors (which may be the sensors in the vehicle headlamp system 1500 or other additional sensors) may be internal or external to the housing of the application platform 1502. Alternatively, or in addition, as shown in the example vehicle headlamp system 1400 of FIG. 14, each LED lighting system 1508 and 1506 may include its own sensor module, connectivity and control module, power module, and/or LED array.

In embodiments, the vehicle headlamp system 1500 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 1506 and 1508 may be sensors (e.g., similar to sensors in the sensor module 1410 of FIG. 14) that identify portions of a scene (e.g., roadway or pedestrian crossing) that require illumination.

Having described the embodiments in detail, those skilled in the art will appreciate that, given the present description, modifications may be made to the embodiments described herein without departing from the spirit of the inventive concept. Therefore, it is not intended that the scope of the invention be limited to the specific embodiments illustrated and described.

What is claimed is:

1. A light-emitting diode (LED) retrofit lamp comprising:
- a centering ring comprising alignment features that define:
  - a mounting position of the LED retrofit lamp within a reflector of a vehicle,
  - a reference axis,
  - a reference direction along the reference axis from a base to a top end of the LED retrofit lamp, and
  - a tolerance box asymmetrically intersecting the reference axis and extending axially along the reference direction from a tolerance box base-side end to a tolerance box top-side end; and
- an LED arrangement configured to emit light transversal to the reference axis and comprising a light-emitting area that extends axially from an LED base-side end to an LED top-side end and positioned with respect to the centering ring such that:
  - the LED base-side end is positioned an axial distance of at least 0.1 mm from the tolerance box base-side end in the reference direction,
  - the LED top-side end is positioned an axial distance of at most 1.5 mm from the tolerance box top-side end in the reference direction, and
  - the light-emitting area extends a distance beyond the tolerance box in the reference direction.

2. The LED retrofit lamp according to claim 1, wherein:
- the LED base-side end is positioned an axial distance of at least one of 0.3 mm, 0.6 mm, 1.0 mm, 1.4 mm, and 1.8 mm from the tolerance box base-side end in the reference direction, or
- the LED top-side end is positioned an axial distance of at most one of 1.0 mm, 0.5 mm, 0.3 mm, and 0.1 mm from the tolerance box top-side end in the reference direction.

3. The LED retrofit lamp according to claim 1, wherein the LED base-side end is positioned an axial distance from the tolerance box base-side end in the reference direction of between 0.8 mm and 1.0 mm.

4. The LED retrofit lamp according to claim 3, wherein the axial position of the centering ring is adjustable without requiring separating the centering ring from the LED retrofit lamp.

5. The LED retrofit lamp according to claim 1, wherein the light-emitting area of the LED arrangement has an axial extension between 3.0 mm and 3.5 mm.

6. The LED retrofit lamp according to claim 5, wherein the light-emitting area of the LED arrangement has an axial extension of 3.2 mm.

7. The LED retrofit lamp according to claim 1, wherein an axial position of the centering ring is changeable.

8. The LED retrofit lamp according to claim 1, wherein the LED retrofit lamp is configured for the reflector of the vehicle that is configured for operation with at least one of an H1, H3, H4, H7, H11, H13, HB3 (9005), HB4 (9006), HB5 (9007), or HIR2 halogen lamp.

9. A vehicle headlight comprising:
a lamp fixture comprising a reflector; and
a light-emitting diode (LED) retrofit lamp, mounted within the reflector at a mounting position, the LED retrofit lamp including:
a centering ring that comprising alignment features that define:
the mounting position of the LED retrofit lamp within the reflector,
a reference axis,
a reference direction along the reference axis from a base to a top end of the LED retrofit lamp, and
a tolerance box asymmetrically intersecting the reference axis and extending axially along the reference direction from a tolerance box base-side end to a tolerance box top-side end, and
an LED arrangement configured to emit light transversal to the reference axis and comprising a light-emitting area that extends axially from an LED base-side end to an LED top-side end and positioned with respect to the centering ring such that:
the LED base-side end is positioned an axial distance of at least 0.1 mm from the tolerance box base-side end in the reference direction,
the LED top-side end is positioned an axial distance of at most 1.5 mm from the tolerance box top-side end in the reference direction, and
the light-emitting area extends a distance beyond the tolerance box in the reference direction.

10. The vehicle headlight according to claim 9, wherein the vehicle headlight is one of a reflection type headlight or a bi-projection type headlight.

11. The vehicle headlight according to claim 9, wherein:
the LED base-side end is positioned an axial distance of at least one of 0.3 mm, 0.6 mm, 1.0 mm, 1.4 mm, and 1.8 mm from the tolerance box base-side end in the reference direction, or
the LED top-side end is positioned an axial distance of at most one of 1.0 mm, 0.5 mm, 0.3 mm, and 0.1 mm from the tolerance box top-side end in the reference direction.

12. The vehicle headlight according to claim 9, wherein the LED base-side end is positioned an axial distance from the tolerance box base-side end in the reference direction of between 0.8 mm and 1.0 mm.

13. The vehicle headlight according to claim 12, wherein the axial position of the centering ring is adjustable without requiring separating the centering ring from the LED retrofit lamp.

14. The vehicle headlight according to claim 9, wherein the light-emitting area of the LED arrangement has an axial extension between 3.0 mm and 3.5 mm.

15. The vehicle headlight according to claim 14, wherein the light-emitting area of the LED arrangement has an axial extension of 3.2 mm.

16. The vehicle headlight according to claim 9, wherein an axial position of the centering ring is changeable.

17. The vehicle headlight according to claim 9, wherein the LED retrofit lamp is configured for the reflector of the vehicle headlight that is configured for operation with at least one of an H1, H3, H4, H7, H11, H13, HB3 (9005), HB4 (9006), HB5 (9007), or HIR2 halogen lamp.

18. A method of manufacturing an LED retrofit lamp for replacing a conventional lamp configured for mounting within a reflector of a vehicle headlight, the method comprising:
forming a centering ring for the LED retrofit lamp based on a centering ring of the conventional lamp such that the centering ring for the LED retrofit lamp comprises alignment features that define:
a mounting position of the LED retrofit lamp within the reflector, a same reference axis as defined by the centering ring of the conventional lamp, the same reference direction as defined by the centering ring of the conventional lamp, and
a same tolerance box as defined by the centering ring of the conventional lamp;
defining a virtual light-emitting area of an LED arrangement for the LED retrofit lamp as a projection of a light emitting area of the LED arrangement on the same reference axis as projected from a point on an edge of an opening of the reflector, the virtual light-emitting area of the LED arrangement extending axially from a virtual LED base-side end to a virtual LED top-side end; and
selecting a shape and a position of the light emitting area of the LED arrangement such that:
the virtual LED base-side end is positioned an axial distance of at most 0.2 mm from box base-side end of the same tolerance box that is opposite to the reference direction,
the virtual LED top-side end is positioned an axial distance of at most 0.5 mm from box top-side end of the same tolerance box in the reference direction, and
the virtual light-emitting area extends a distance beyond the same tolerance box in the reference direction.

19. The method according to claim 18, wherein the shape and the position of the light emitting area of the LED arrangement is further selected such that:
the virtual LED base-side end is positioned an axial distance of at most one of 0.0 mm and −0.1 mm from the base-side end of the same tolerance box that is opposite to the reference direction, or
the virtual LED top-side end is positioned an axial distance of at most one of 0.3 mm, 0.1 mm, 0.0 mm, and −0.1 mm from the top-side end of the same tolerance box in the reference direction.

20. The method according to claim 18, wherein the virtual LED base-side end is positioned an axial distance from the base-side end of the same tolerance box in the reference direction of between 0.8 mm and 1.0 mm.

* * * * *